US006960052B2

(12) United States Patent
Lutz et al.

(10) Patent No.: US 6,960,052 B2
(45) Date of Patent: Nov. 1, 2005

(54) MACHINE TOOL AND METHOD OF ADJUSTING THE SPINDLE OF A MACHINE TOOL

(75) Inventors: Heinrich Lutz, Dirlewang (DE); Walter Keim, Mindelheim (DE)

(73) Assignee: Grob-Werke Burkhart Grob e.K., Mindelheim (DE)

( * ) Notice: Subject to any disclaimer, the term of this patent is extended or adjusted under 35 U.S.C. 154(b) by 0 days.

(21) Appl. No.: 10/283,205

(22) Filed: Oct. 30, 2002

(65) Prior Publication Data
US 2003/0123945 A1 Jul. 3, 2003

(30) Foreign Application Priority Data
Oct. 31, 2001 (DE) .......................... 101 53 294

(51) Int. Cl.[7] .......................... B23C 1/12; G06F 19/00
(52) U.S. Cl. .................. 409/235; 409/201; 700/193
(58) Field of Search .......................... 409/235, 201, 409/131, 132, 186, 187, 193, 194, 207, 208, 209, 135, 204, 211, 216; 700/193

(56) References Cited

U.S. PATENT DOCUMENTS

| 4,621,407 | A | * | 11/1986 | Suzuki | 409/235 |
|---|---|---|---|---|---|
| 5,007,006 | A | * | 4/1991 | Taylor et al. | 700/193 |
| 5,581,467 | A | * | 12/1996 | Yasuda | 700/193 |
| 6,099,217 | A | * | 8/2000 | Wiegand et al. | 409/201 |
| 6,301,520 | B1 | * | 10/2001 | Hayashi | 700/193 |
| 6,456,896 | B1 | * | 9/2002 | Ito et al. | 700/193 |

* cited by examiner

*Primary Examiner*—Derris H. Banks
*Assistant Examiner*—Dana Ross
(74) *Attorney, Agent, or Firm*—Jacobson Holman PLLC

(57) ABSTRACT

A machine tool having at least one or more spindles that can be positioned in space, the spindle being mounted on displaceable slides by rods and the displacement of the slides leading to the spindle being positioned in space. A correction device is provided which defines the actual position of the spindle relating to one or more reference points.

28 Claims, 5 Drawing Sheets

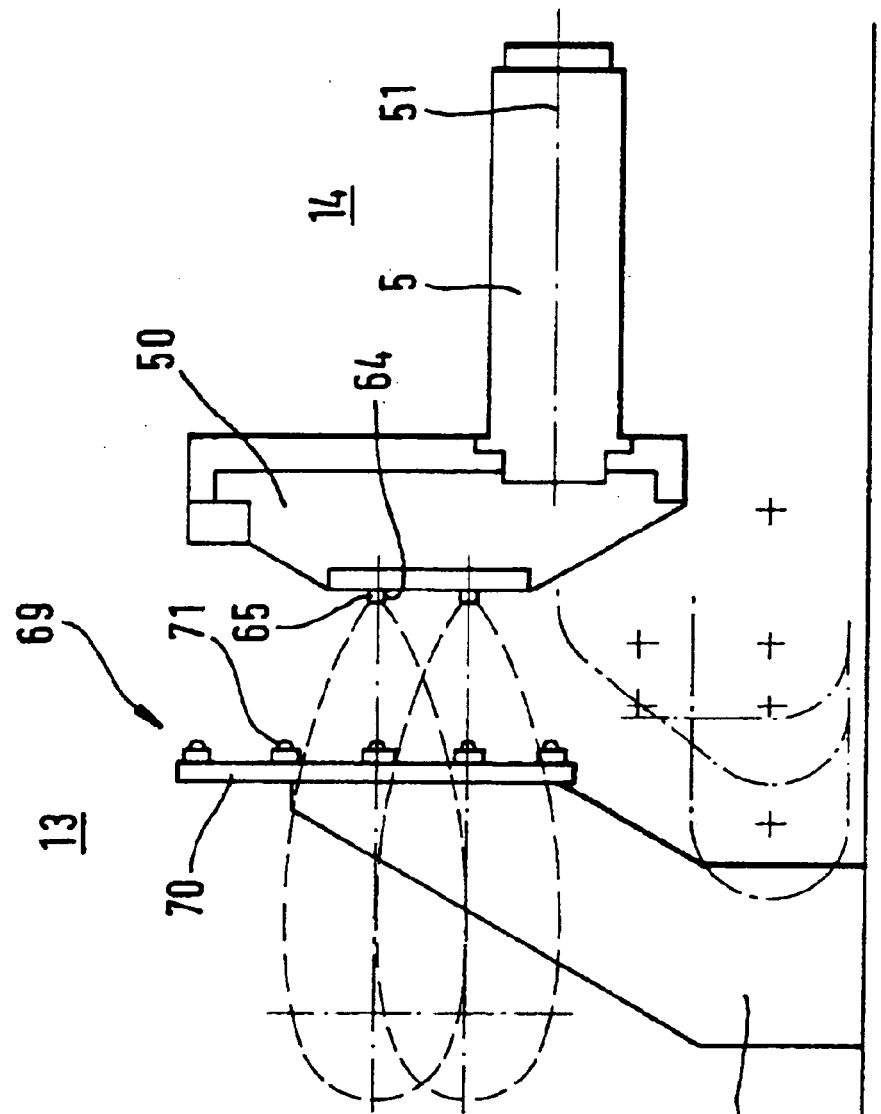
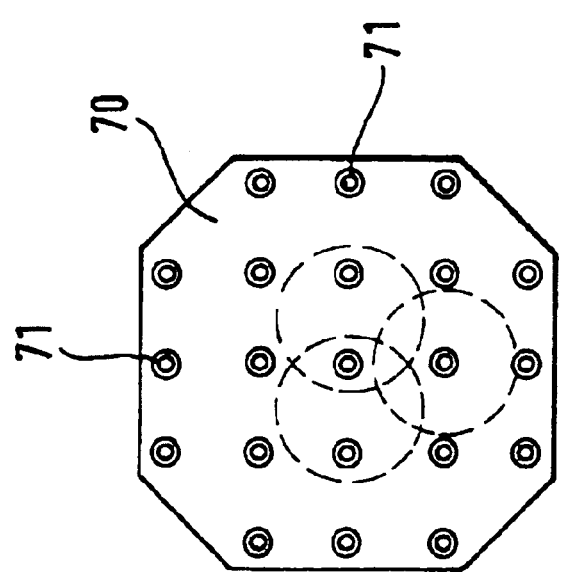
Fig. 3a
Fig. 3b

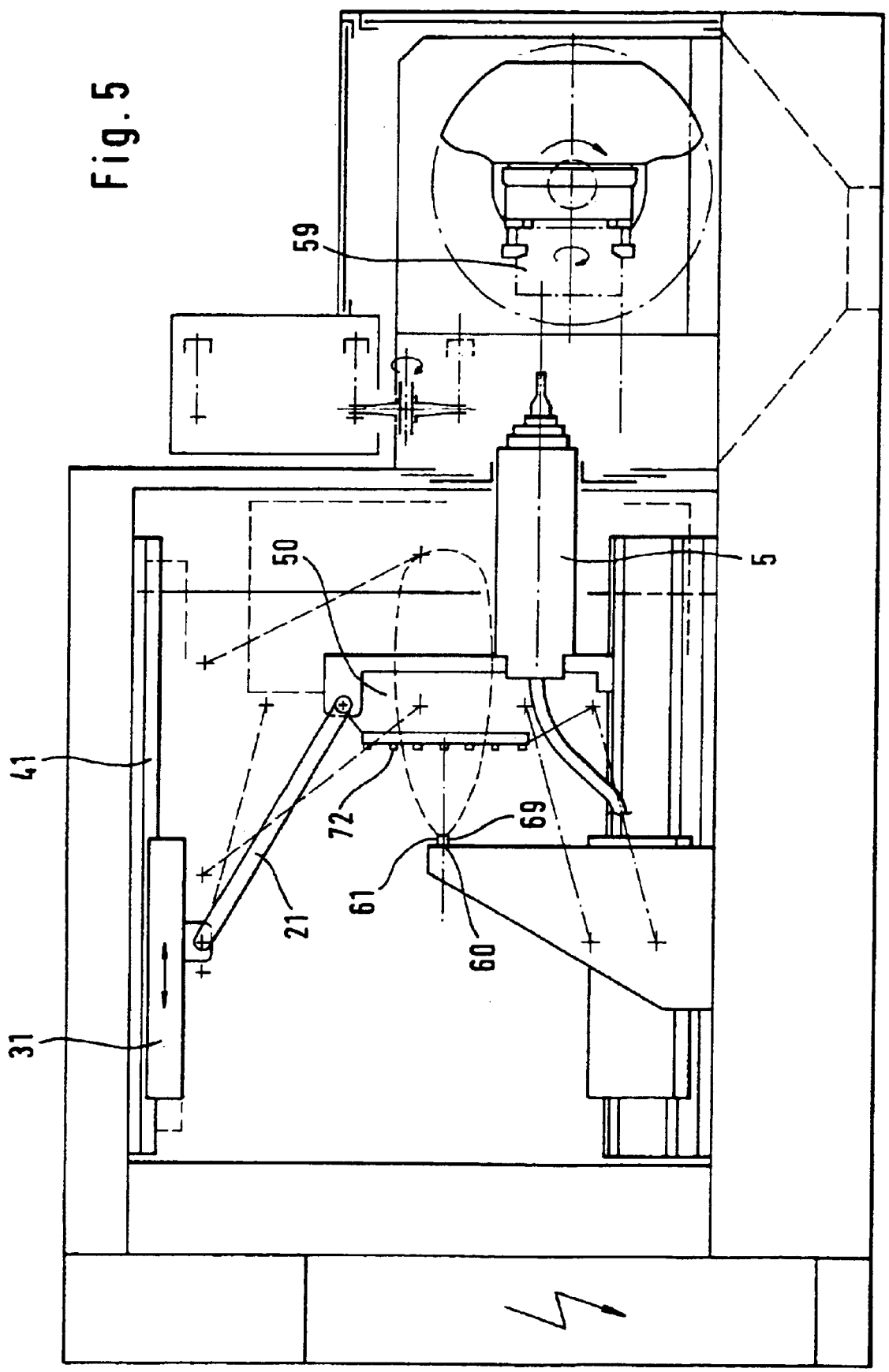

MACHINE TOOL AND METHOD OF ADJUSTING THE SPINDLE OF A MACHINE TOOL

FIELD OF THE INVENTION

The invention relates to a machine tool having at least one or more spindles that can be positioned in space, the spindle being mounted on displaceable slides by means of rods and the displacement of the slides leading to the spindle being positioned in space.

BACKGROUND OF THE INVENTION

The aforementioned machines are known as machine tools with "rod kinematics". The advantage of such machine tools equipped with rod kinematics as compared with machine tools equipped with normal cross slides resides in the simple construction of the machines with rod kinematics. When cross slides are used, the outlay for each cross slide increases, since the first axis has to accommodate the weight of the following axes. This results in correspondingly large, voluminous machine tools, which require relatively large drives in order to accelerate the large masses in an acceptable time. As opposed to this concept, in machine tools with rod kinematics, each rod arrangement is in principle dimensioned to be the same, since these do not have to absorb any loads among themselves. This results in a correspondingly low outlay for the implementation of the various degrees of freedom, and the mass decreases, as a result of which the drive can also be dimensioned to be simpler, since with lighter drives the same acceleration can be achieved with lower masses.

In this case, the positioning of the spindle is carried out by means of an appropriate position of the slides on appropriate guides. However, the result may then be that the position of the spindle deviates from the desired position, for example because of the development of heat in the tool spindle and/or the rods or as a result of fabrication tolerances during production of the machine.

It is an object of the present invention to improve a machine tool as described at the beginning to the effect that the machine tool also operates as exactly as possible during operation.

SUMMARY OF THE INVENTION

In order to achieve this object, the invention is based on a machine tool as described at the beginning and proposes that a correcting device be provided which determines the actual position of the spindle with respect to one or more reference points or with respect to the workpiece.

The proposal according to the invention achieves the situation where, irrespective of the position of the slides on their guides, the actual position of the spindle is determined. This is used to derive whether this actual position agrees with the desired position or not and whether appropriate corrections then have to be made or not.

The invention is not only based on the correcting device determining the position of the spindle with respect to the reference points and correcting it accordingly; ultimately it is a matter of the spindle acting on the workpiece and machining the latter correctly in accordance with the machining program. In a variant of the invention, therefore, provision is also made for the correcting device also to be used with respect to the position of the spindle in relation to the workpiece, and there are likewise a number of variants for this purpose. Firstly, it is possible to determine the relative position of workpiece and spindle and to arrange for appropriate corrections. In another variant, it is possible that the position of the workpiece with respect to a reference point is also checked, which is advantageous, for example, in particular in measurements on circular axes. In this case, the workpiece is, for example, mounted on circular axes such as circular tables or pivoting units and, by means of the correcting device, for example, the winding positioner accuracy of this circular axis is checked.

In a preferred refinement of the invention, provision is made for the actual position of the spindle or of the workpiece to be compared with the desired position by the correcting device and/or a controller, and for action to then be taken on the position of the slide or of the slides in such a way that the desired position is reached. As a result of using the correcting device, for example, possible dimensional inaccuracies are detected, and are corrected appropriately. In this case, the area of use of such an arrangement is not restricted to rod-kinematic machines, as they are known, but can also be used in an analogous manner in conventional machines, where a first slide carries the guide track of the second slide (for example in the case of cross guidance).

The arrangement of the reference points can in this case be made as desired. For example, it is possible to define the reference point in the spindle or the spindle holder itself. For example, it is possible if the correcting device operates via a temperature-induced length change to select the length of a corresponding dimension on the spindle or spindle holder as a reference point. The term reference point is in this case to be understood not only as a fixed geometric position but as a reference point with regard to the determinations of the corresponding dimensional deviation. This is also carried out, for example, by comparing the desired length with the actual length, as in the aforementioned example. In this case, it is beneficial if the correcting device has one or more temperature sensors and the correcting device determines the temperature-induced length change in the rod and/or the spindle with respect to a reference point.

Depending on the area of use, it is advantageous possibly to provide one or more reference points. In this case, the reference to a plurality of points is beneficial to positioning the spindle in space. It may be that dimensional inaccuracies exist only with regard to one dimension, so that the use of a reference point is also sufficient in other applications.

In addition to a correcting device which is constructed on temperature sensors, it is possible for an electrical or mechanical measuring arrangement to be provided and for said arrangement to provide the appropriate actual values. In general terms, it is advantageous to use a glass rod or other elements as a reference scale whose temperature-induced length change is extremely small.

As an alternative to an electrical or mechanical measuring arrangement, the invention likewise provides for the correcting device to have an optical measuring arrangement. An optical measuring arrangement can be formed, for example, by an interference pattern. However, it is also possible for example to use a propagation time measurement for determining distance. In this case, it is advantageous if the correcting device has one or more lasers.

The term "optical measuring arrangement" is in this case not just limited to the visible spectral range of the electromagnetic spectrum, but generally comprises all wavelengths which can be used industrially. Advantageous in this case are measuring arrangements which operate in the infrared or ultraviolet measuring range, since these are disrupted relatively little by ambient light. In this case, optical measuring arrangements normally have a transmitter-receiver arrangement, it also being possible for transmitter or receiver to act as reference points.

In a preferred refinement of the invention, provision is made for the correcting device to determine the distance of the spindle or an element connected to the spindle, for example the slide (which moves the spindle via rods) or the supporting plate of the spindle, from a reference point. Length changes which, for example, can result in the connecting rod between slide and spindle, lead to corresponding dimensional inaccuracies in the position of the slide. It is therefore beneficial to use the correcting device in such a way that the respective slide position is determined.

Alternatively, however, it is also advantageous for the spindle position to be determined. In this case, for example, the distance between the spindle and the reference point is of interest, or else the distance between an element connected to the spindle, for example the supporting plate of the spindle, to the reference point is of interest.

In addition to the measurement of the distance, however, with the correcting device according to the invention it is also possible without difficulty to determine the angle between a point on the spindle or from an element connected to the spindle and two reference points, which results in a corresponding angular dimension.

According to the invention, it is possible for the reference points to be arranged in the working space of the spindle and/or in the rear space of the spindle. Accordingly, provision is made for the correcting device to act in the working space or in the rear space of the spindle. For the case in which it is provided in the working space, for example, the relative position of the spindle in relation to the workpiece is determined and influenced appropriately by the correcting device. However, it is also possible for the correcting device to be arranged in the rear space of the spindle and to determine and carry out the appropriate corrections on the rear side. The arrangement in the rear space has the advantage that here, in particular for example, optical measurements are not impaired by swarf or splashing cooling fluid. On the other hand, the use of the correcting device in the working space provides the advantage here that, in particular, the relative position of the working spindle in relation to the workpiece can be determined.

There is likewise a plurality of variants for the arrangement of the reference point. For example, provision is made for the reference point to be arranged on the frame of the machine tool or on an element independent of the machine tool, for example a wall or the like. In this case, positioning of the reference point which fixes the latter as accurately as possible in terms of its position will beneficially be chosen.

As an alternative to this, it is possible for a moveable reference point to be provided. For example, the reference point is provided on the slide which holds the spindle via the rod. In corresponding adjustment positions, the distance of the spindle from the reference point is measured and the measured actual value is compared with the respective desired value. In this case, a plurality of slides will beneficially be equipped with appropriate reference points, and the respective position will therefore be determined by triangulation.

As already mentioned, an optically acting measuring arrangement is understood not just to mean the optically visible spectral range but also includes the entire electromagnetic spectrum. In this case, provision is made for example to use an optical transmitter and receiver whose distance is determined. However, it is also possible to provide the optical transmitter and receiver at the same location and to use a reflector which reflects back some of the light emitted by the transmitter, which is then picked up by the receiver. In this case, the receiver does not have to be installed exactly at the same location as the transmitter. In a further variant according to the invention, it is possible to arrange the receiver at a third location.

In a preferred refinement of the invention, provision is made for the correcting device to comprise one or a plurality of measuring sections and a reference section, for the correcting device in particular to comprise an infrared broadband light source or a widened laser beam and for the components reflected on the measuring section and on the reference section to be superimposed to form an interference signal that can be evaluated. By means of such a variant according to the invention, a high-resolution means of establishing the position is also provided. This is advantageous in particular in highly accurate machine tools, such as in the machine tools according to the invention or else machining centers or the like, where high, micron-accurate positioning is concerned. The advantage of using an infrared broadband light source resides in the low susceptibility to interference on account of ambient light. The use of a laser beam or a widened laser beam is likewise advantageous if recourse is had to appropriate laser measuring methods, and a widened laser beam also permits a certain tolerance in space.

In addition to correcting the position of the spindle, the invention also proposes that the correcting device determine and if necessary adjust the position of the spindle axis. By means of this variant according to the invention, for example, even weakened bearings or other defects are corrected, which otherwise could lead to tilting of the axis and also in this way could form a source of dimensional inaccuracies.

The concept of the invention can in this case also be used on machine tools in which a plurality of spindles are carried by a holding plate and the holding plate is mounted by means of rods having slides which can be moved and positioned on guide tracks. It has transpired that multi-spindle machine tools have a correspondingly higher efficiency, in particular when the dimension of the machine tool is chosen to be such that, with two tool spindles guided in parallel, identical machining steps can be carried out simultaneously, that is to say at the same time, on the same or different workpieces.

In this case, it is further beneficial if the correcting device determines and if necessary corrects the position of the holding plate which rotates two or more spindles, and if at least one spindle can have its position changed with respect to the position of the other spindle by means of a correcting element, in particular a piezoelectric crystal or the like. By means of this variant according to the invention, it becomes possible to correct errors which may occur in the alignment of the two spindles. Corresponding errors can lie in a parallel offset or else in tilting of the respective axes in relation to each other, each of which leads to dimensional inaccuracies. In this case, provision is beneficially made for each tool spindle to be appropriately measured with respect to its position and also its axial attitude and to be monitored and corrected if necessary by the correcting device.

The correcting element used is beneficially a piezoelectric crystal or the like, the use of a piezoelectric crystal being beneficial since it provides a means which acts continuously in order to carry out correspondingly small dimensional corrections.

The invention also relates to a method of adjusting the position of a tool spindle. The tool spindle or spindle is in this case mounted as described via rods on displaceable slides. The object according to the invention is also achieved by the following proposed method. The correcting device determines the actual position of the spindle, and the actual position is then compared with the desired position by the controller and/or the correcting device and, in accordance with the position deviation, the position of the slides is changed in order to bring the actual position close to the desired position and/or make it equal.

In this case, the proposal according to the invention is used not only to compensate for the possible positional change because of the thermal expansion of the components forming the machine tool but, in a similar way, can also of course be used to eliminate other circumstances which have a detrimental effect on the exact positioning. This includes, for example, play in the joints, wear or fabrication tolerances during production of the machine, sagging and the like.

According to the method of the invention and the machine tool according to the invention, it is not necessary here to provide two separate controllers. Controlling the position of the slides can in this case be provided by the correcting device in the same way, or else the correcting device transmits appropriate control values to the controller of the slides, which are then positioned appropriately. Therefore, various concepts can be followed. Firstly, it is possible to have this adjustment carried out continuously in parallel, or else to provide the adjustment of the position of the tool spindle in a machining pause, for example when the workpiece is being changed.

In a further variant according to the invention, provision is made for the adjustment of the position to be carried out, for example, in tool-change pauses in adjustment positions into which the slides are moved. During the tool-change pauses, these adjustment and correction measures can be carried out without prolonging the cycle times or the other machining times.

In a preferred refinement of the invention, provision is made for the adjustment to be carried out as a normalization step before the actual use of the machine tool, and for the correcting device to generate corresponding correction data which is stored in the controller as correction information for the respective positioning of the spindle. This procedure according to the invention permits the use of a possibly very complicated and also high-value correcting device which is used in a normalization step to determine appropriate dimensional tolerances, that is to say correction data, and make them available to the respective machine controller as correction information. In this case, for example, the spindle can be moved into a large number of positions and corresponding actual values be generated in this way, which are compared with the reference values which the controller predefines. The difference between the reference and actual values, in each case based on the position of the spindle, then gives correction information which is then called up appropriately during the actual use of the machine tool. In this case, it is possible either to generate a continuous correction function or else to generate the intermediate values of the spindle position by means of an interpolation from the large amount of correction information which comprises a pair of values, the position of the spindle on the one hand and correction data on the other hand.

The obvious thing then is to remove the correcting device from the machine tool after the normalization step has been carried out. Alternatively, it is of course possible to leave a correcting device in the machine, for example in order to be able to perform a continuous correction or adjustment. However, it is also possible to install the correcting device again, for example for maintenance purposes, and to remeasure the machine.

The proposal according to the invention reliably ensures that not only necessary corrections based on the use of the machine (for example elevated temperatures, wear and so on) can be corrected, but also permits the elimination of mounting faults and the like.

As a result of this, a machine which operates precisely over a long time and also supplies high precision is achieved.

In a further refinement of the invention, it is proposed that the machine tool and/or the correcting device have at least one temperature sensor and, in a normalization step, the correcting device be used to generate a set of correction data with respect to the respective positioning of the spindle on the basis of the temperature.

In particular in high-precision machining, the temperature influence on the positioning of the spindle is important. In this case, the highly accurate correcting device is used to collect appropriate correction data firstly as a function of the position of the tool spindle (as outlined above) and secondly, additionally, as a function of various temperatures. This data is in turn made available to the controller as correction information. What is concerned here, for example, is a value matrix which depends firstly on the temperature and secondly on the tool position. Here, the correction data can relate to only one or all the various dimensions measured. However, data preparation of this type is possible without difficulty by using conventional controllers (CNC or computer-monitored).

In this case, it is advantageous for the correcting device to have one or more temperature sensors. In this case, the temperature sensors remain in the machine tool or else they form on their own the correcting device, since the actual measuring arrangement of the correcting device can be removed from the machine again following an appropriate normalization step and, for example, used for other normalization purposes. The actual correction information is then determined and used by the correcting device on the basis of the measured temperature. Here, the correcting device has a corresponding value table, in which the correction information on the basis of the normalization step is read or else, according to the other variant of the invention, the temperature values are converted by the correcting device with a view to a temperature-dependent length change, and in this way made available to the position controller of the spindle.

In this case, the temperature profile is beneficially recorded in the normalization step, which means that the machine tool according to the invention is correspondingly normalized in a temperature-controllable chamber.

BRIEF DESCRIPTION OF THE DRAWINGS

The method according to the invention and the machine tool will be described further by using the further claims and with the aid of the drawings, in which:

FIGS. 1, 2, 5 each show various possible variants of the invention in a schematic view;

FIG. 3a shows a further variant of the invention in a schematic view;

FIG. 3b shows a side view according to FIG. 3a;

FIG. 4b shows a detail according to FIG. 4a.

DETAILED DESCRIPTION OF THE PREFERRED EMBODIMENTS

Figure 1:
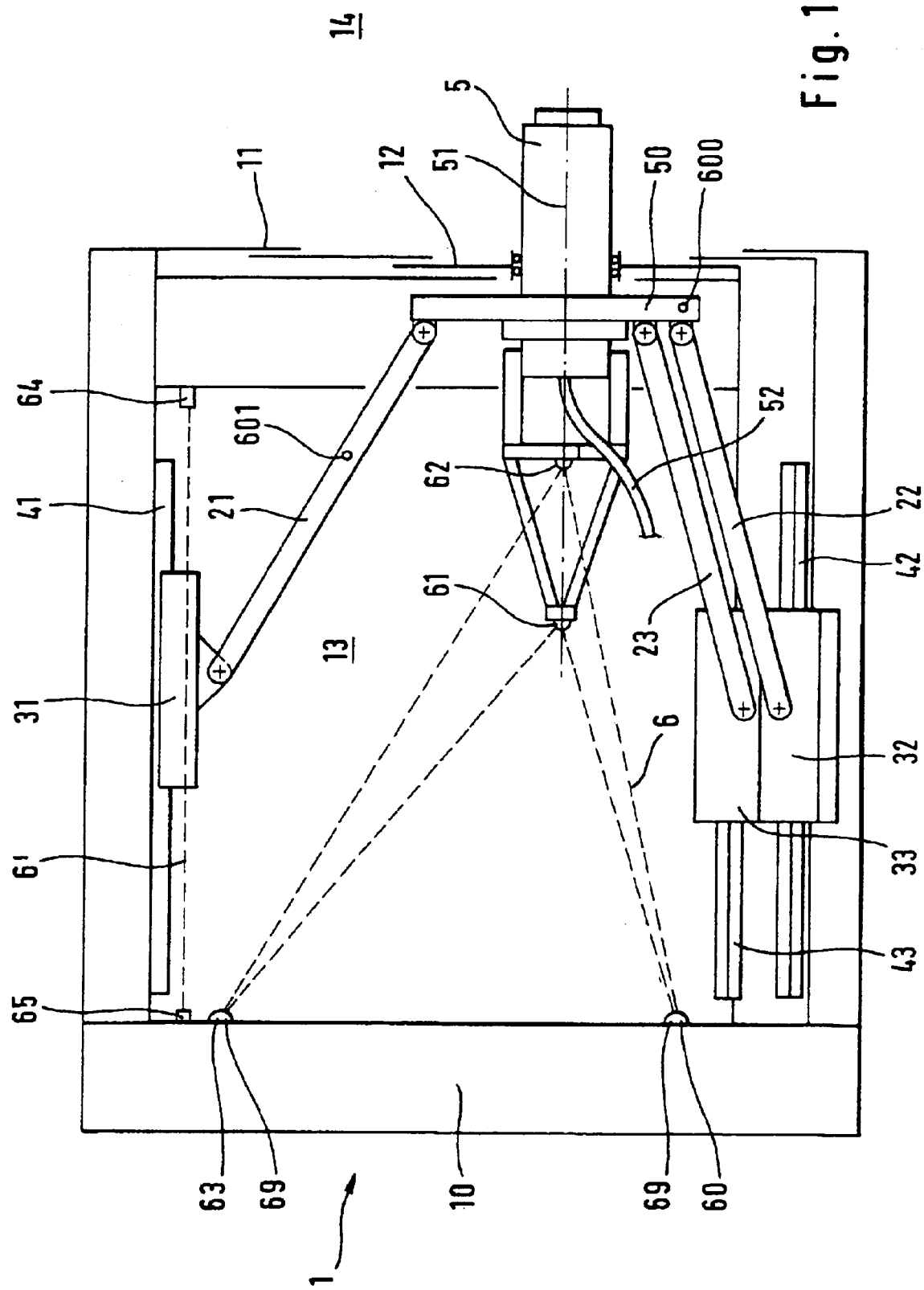

A machine tool 1 according to the invention is illustrated schematically in FIG. 1. The machine tool 1 has a machine frame 10, in which the spindle 5 is mounted. In this case, the tool spindle 5 acts in the working space 14, which is delimited by the bulkhead wall 11 from the rear space 13 of the spindle 5. The bulkhead wall 11 comprises two walls arranged substantially parallel, between which a wall part 12 fixed in the spindle 5 is guided. By means of an appropriate, telescope-like arrangement of the various wall parts 12, a rear space 13 delimited from the working space 14 is achieved in interaction with the bulkhead wall 11.

Figure 2:
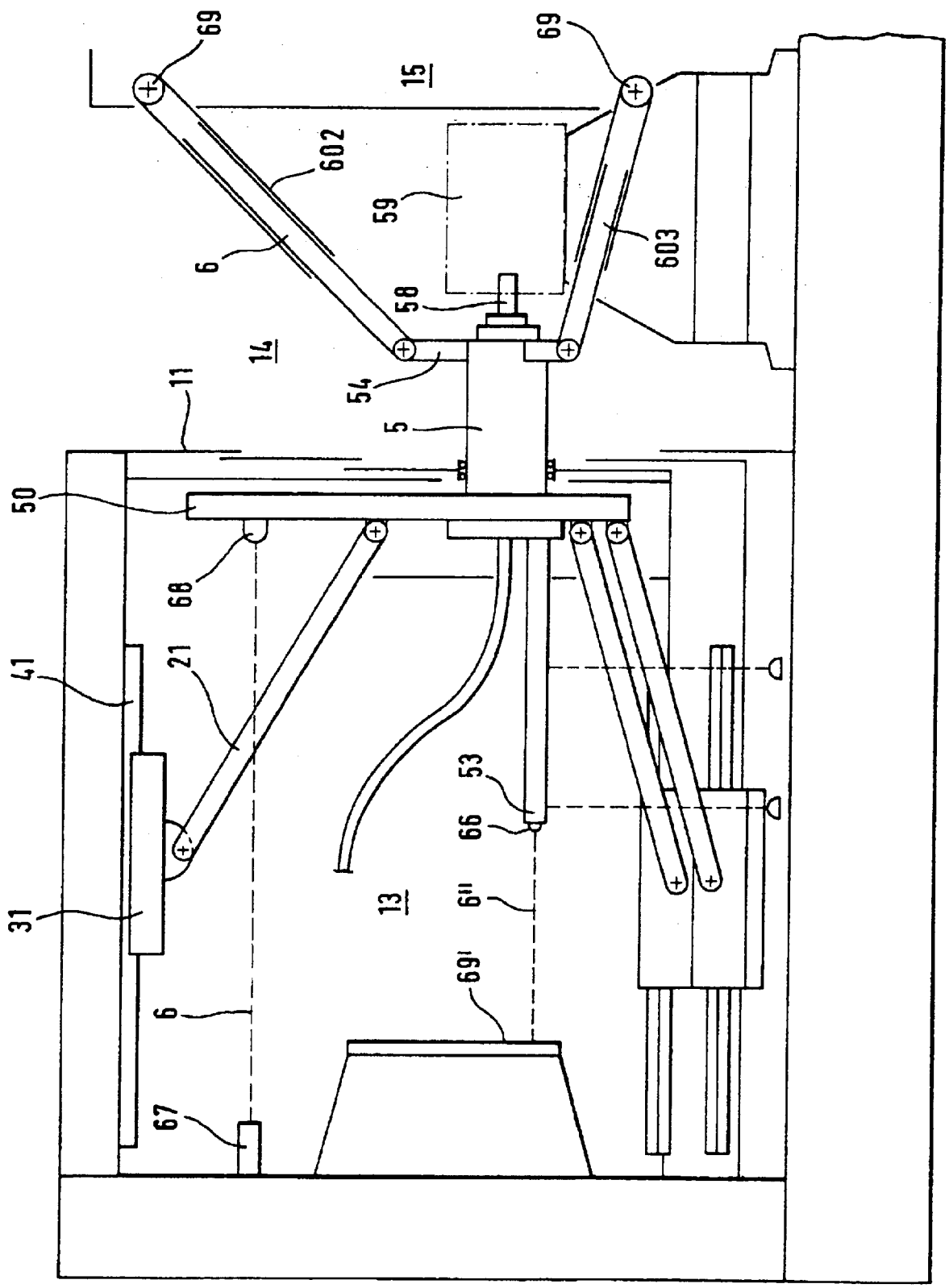

In the working space 14 there is the workpiece 59 (see FIG. 2). For machining purposes, the spindle 5 acts on the workpiece 59 via a tool 58. As a rule, the working space 14 is likewise encapsulated so as to be sealed against spray water, since cooling liquid is also sprayed onto the workpiece and tool in the working space, in order to cool said tool and to transport swarf away.

Provided in the machine frame 10 are guide tracks 41, 42 and 43 for the various movement axes of the spindle 5. In the concept presented here of a rod-kinematic machine tool the various mountings of the movement axis are not constructed so as to be orthogonal to one another but are implemented independently and separately via corresponding slides on guide tracks.

In the concept presented here, six rods 21, 22, 23 are provided, which connect the holding plate 50 of the spindle 5 in an articulated manner to a slide 31, 32 and 33 in each case. The rods 21, 22 and 23 are mounted in this case in an articulated manner both on the holding plate 50 and on the slide 31, 32, 33. The slides 31, 32, 33 are moved linearly on a guide track 41, 42, 43. As a result of the interplay of the various movements of the slides 31, 32, 33 on their guide tracks 41, 42, 43, it is possible to position the spindle 5 in space. For instance, in order to move the spindle 5 upward, the slide 31 is offset to the left on the guide track 41 and, at the same time, the two slides 32 and 33 are moved to the right on the guide tracks 42 and 43. As a result, the working spindle 5 is therefore moved upward.

The working spindle 5 is held by the holding plate 50. The spindle 5 is used for rotational drive of the tool 58 about the spindle axis 51. For highly accurate machining of the workpieces, the knowledge of the position of the spindle axis 51 and/or of the respective machining surfaces of the tool 58 is important.

Furthermore, in a variant of the invention, it can also be important to correct or to influence the relative attitude of the workpiece 59 to the spindle 5 or tool 58 by means of the correcting device.

The rotational drive of the spindle 5 is supplied with power via the electrical feed line 52.

Figure 4B:
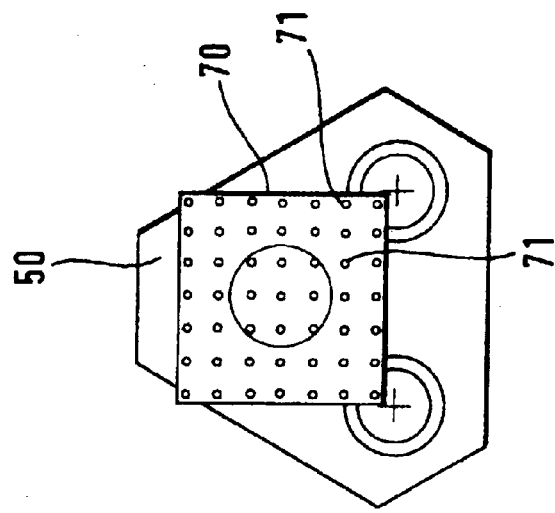
Figure 4A:
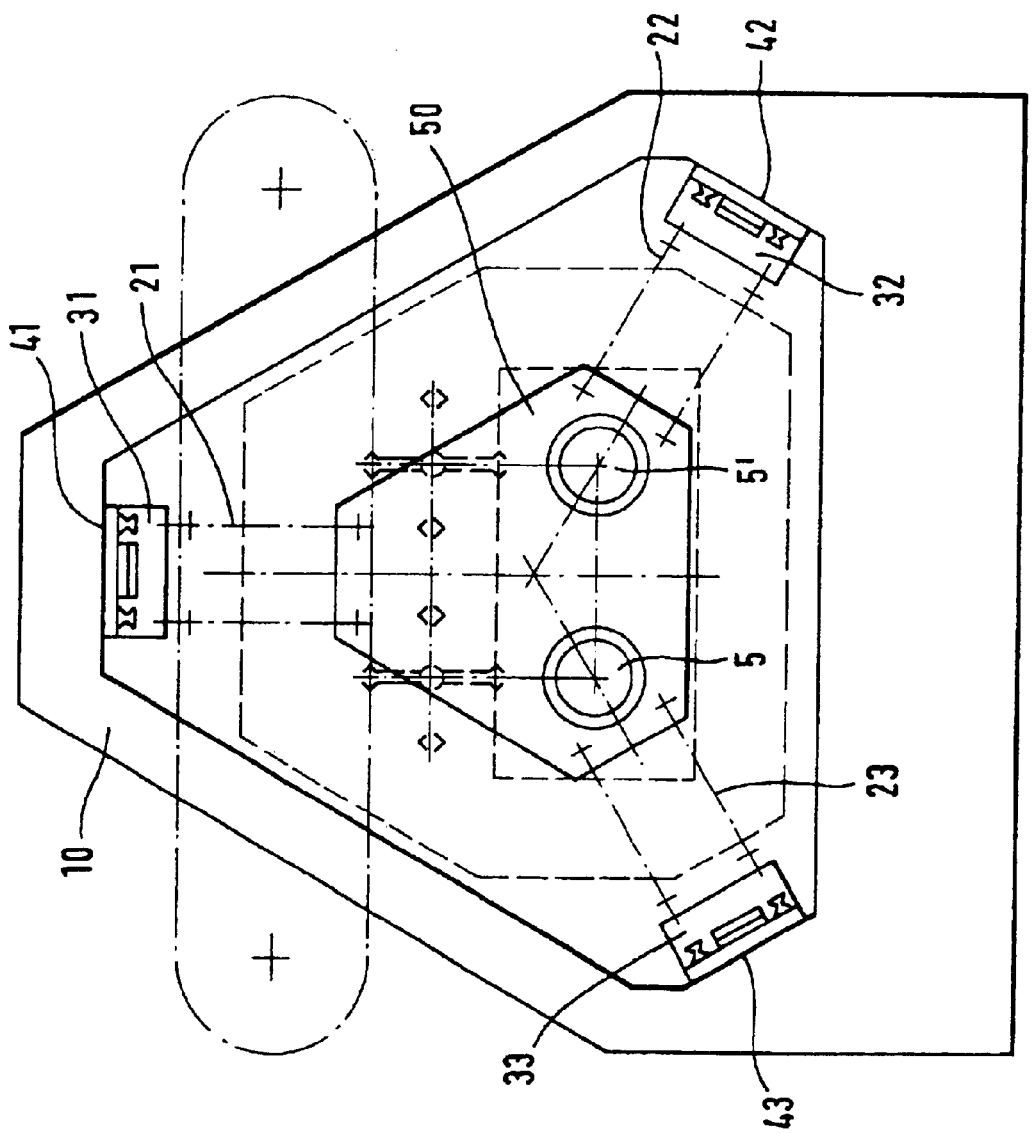
FIG. 4a shows a further variant of the invention in a view.

In the rod-kinematic machine tools 1 of interest here, the guide tracks 41, 42, 43 are arranged to run in parallel, their spacing resulting in an equilateral or isosceles triangle (for example FIG. 4a). In this way, the geometric conditions for appropriate determination of position are made easier. In these machine tools, a total of six rods is beneficially employed, by means of which the spindle is mounted on the respective slides. The six rods are divided into three pairs of rods, one pair of rods in each case being mounted on a slide.

The invention relates in particular to the accurate positioning of the tool spindle in the working space 14. For this purpose, the invention proposes the use of a correcting device 6 which determines the actual position of the spindle 5 with respect to one or more reference points 69. In FIGS. 1, 2, various concepts for the correcting device 6 are proposed for this purpose.

In FIG. 1, a temperature sensor on the spindle is described by 600. As a result, the temperature-induced thermal expansion of the spindle can be determined. In this case, appropriate computing effort is provided by the correcting device and/or the machine controller. In one variant, the positional change can also be determined from empirically collected data in a database. The result of this evaluation is then a corresponding, actual position statement, which is compared with the geometric position. In the same way, it is also possible likewise to draw corresponding conclusions about the thermal expansion via the temperature sensor 601 arranged on the rod 21, and therefore likewise to correct corresponding dimensional inaccuracies via the controller.

It is entirely also possible to select an optical, electrical or mechanical measuring arrangement as correcting devices 6. In the case of an optical arrangement, for example with the aid of a laser 61, 62, light is aimed at one or more receivers 60, 63 and the respective distance is determined via known distance measuring methods. In this case, this can be done for example by means of a corresponding light cone, as indicated in fig.

However, a conical arrangement as in the proposal is also possible with the transmitter.

In this case, an optical measuring arrangement requires a transmitter and a receiver. FIG. 1 shows a variant according to the invention in which the two transmitters 61, 62 are arranged on the extension of the spindle axis 51. In such an arrangement, it is possible to determine the position of the spindle axis 51 directly.

The correcting devices 6, 6' indicated in FIG. 1 are preferably used in the rear space 13, which provides the advantage that these do not interfere in the working space 14. However, it is also in accordance with the idea of the invention for the correcting device 6 to be arranged in the working space 14. This is shown, for example, in FIG. 2, in which a position plate 54 on the spindle 5 is provided in the working space 14, on which plate three telescopic supports 602, 603 (the third support is hidden) are supported in an articulated manner on respective reference points 69. In accordance with the dimension of the extension of the supports 602, 603, an actual determination of position is possible. It may be made, for example, via mechanical or other (electrical) measuring arrangements. Of course, the use of a laser measuring system is also again possible here. Given appropriate configuration (dimensioning) of the position plate 54, the supports 602, 603 do not interfere during the machining of the workpiece 59 either.

The invention permits both the arrangements of the reference points 69 in the rear space 13 or in the working space 14 and likewise proposes providing the reference points 69 either on the machine tool 1, the machine frame 10 or a separate reference wall 15, independent of the machine tool 1. In this case, the reference point 69 may be formed by an appropriate transmitter or receiver of the measuring arrangement. This depends ultimately on the selection of the various measuring arrangements which can be used according to the invention, and do not restrict the invention in terms of its area of use. In the case, the reference wall 15 is arranged either in the working space 14 or in the rear space 13.

In FIG. 2, two further correcting devices 6 are shown by way of example in the rear space 13. In the first, on the holding plate 50 of larger form there is a receiver 68, whose distance from the laser 67 is determined and therefore forms the correcting device. A similar action can be carried out via the spindle element 53, where the spacing of the region at the end of the spindle element 53 from a reference surface 69' is determined. This is the correcting device 6".

The rod-kinematic machine tools presented here do not necessarily have to have guide tracks 41 to 43 running parallel to one another; these can also be other arrangements.

According to the invention, it is proposed that a large number of reference points 69 arranged in the manner of a network be provided. Such a variant according to the invention is shown, for example, in FIG. 3a. A plurality of reflectors 71 are fixed at the grid points of a network on the plate 70. The spindle 5 or the holding plate 50 of the spindle 5 bears a plurality of transmitters 65 on its rear side, which emit broadband light, for example. Arranged beside them is a receiver 64, which picks up the light reflected by the reflectors 71 and, using appropriate, known distance methods, uses it to determine the distance of the spindle from the plate 70.

FIG. 3b shows a plan view of the approximate arrangement of the plate 70. The result is that in each case a plurality of reflectors lie in the emission cone of the transmitter 65 and contribute appropriately to the determination of the position of the spindle 5. These reflectors can also overlap one another. It is also possible for a total of three transmitters 65 to be used, and in this way an accurate determination of the position in space is possible. In this case, the plate 70 acts in principle as a reference point although a large number of individual reflectors 71 are provided, which in turn in each case act as reference points, since in each case the distance from the respective individual reflectors 71 is determined.

FIG. 4a shows an arrangement of the guide tracks 41, 42, 43 in relation to one another in the machine frame 10 which is in principle isosceles.

The principle illustrated in FIG. 3a is described by a plurality of reference points 69 which are preferably formed as reflectors 71 and are arranged in fixed positions on the machine frame 10. Arranged on the spindle 5 or its supporting plate 50 are an optical transmitter 65 and an optical receiver 64, which evaluates the light reflected back. The advantage of a large number of reflectors or reference points arranged in the manner of a network lies in very high reliability of the corresponding position determination. Since a plurality of reflectors are available, the position determination can be checked and also secured by means of multiple measurements. In addition, the disruption of a reflector does not disrupt the reliable position determination, depending on the design of the measuring algorithm. On the basis of the exact position determination, the correcting device is permitted to set the spindle or spindle position exactly.

In FIG. 5, a moveable or stationary optical transmitter 61 is provided as a reference point 69 and one or more reflectors 72, preferably arranged in a plurality of lines, are provided on the spindle 5 or on its supporting plate 50, an optical receiver 60 also being provided, which evaluates the reflected light. In the example shown in FIG. 5, the optical receiver 60 is located in the vicinity of the optical transmitter 61, to be specific on the slide, which is indicated here as being able to be moved but can be fixed. The principle shown here corresponds to a kinematic reversal of the principle shown in FIGS. 3a, 3b. Here, the reference points are not formed by the reflectors but by the transmitter-receiver arrangement 60, 61 which, in principle, can be fixed. The reflectors 72 that reflect the light are located on the rear of the spindle 5 and move with the latter.

The claims now filed with the application and subsequently are attempts at a formulation without prejudice to the achievement of further-reaching protection.

Should it be the case here, during closer examination, in particular including the relevant prior art, that the result is that one or another feature is beneficial for the objective of the invention but is not critically important, then of course a formulation is then intended which no longer has such a feature, in particular in the main claim.

The back-references listed in the dependent claims refer to the further development of the subject of the main claim by the features of the respective subclaim. However, these should not be understood as dispensing with the achievement of self-contained, objective protection for the features of the subclaims making the back-reference.

Features which have hitherto been disclosed only in the description can be claimed, in the course of the proceedings, as having significance essential to the invention, for example in order to delimit them from the prior art.

Features which have been disclosed only in the description or else individual features from claims which cover a number of features can be transferred into the first claim at any time in order to delimit it from the prior art, specifically even when such features have been mentioned in connection with other features or achieve particularly beneficial results in connection with other features.

What is claimed is:

1. A machine tool comprising
   at least one spindle for holding a tool working on a workpiece, the workpiece being located in a working space,
   a wall dividing the working space and a rear space,
   displaceable slides on which said spindle is mounted by rods, said displaceable slides being located in the rear space behind the spindle and located on an opposite side of the wall from said working space, and
   a correcting device, said correcting device determining an actual position of said spindle with respect to one or more reference points and correcting the position of the spindle by controlling movement of the displaceable slides located in the rear space, the one or more reference points being arranged in the rear space of said spindle.

2. The machine tool of claim 1, wherein the actual position of said spindle or of said workpiece is compared with a predetermined position by at least one of said correcting device and a controller and action is then taken on said slides in such a way that the predetermined position is reached.

3. The machine tool of claim 1, wherein said correcting device determines at least one of the position of said spindle and the position of said workpiece and a relative position of said spindle or a tool carried by said spindle in relation to said workpiece.

4. The machine tool of claim 1, wherein said correcting device has one or more temperature sensors, and said correcting device determines temperature-induced length changes of at least one of said rod and of said spindle with respect to a reference point.

5. The machine tool of claim 1, wherein said correcting device has one of an optical measuring arrangement and a measuring arrangement operating with electromagnetic waves.

6. The machine tool of claim 1, wherein said correcting device has one of an electrical measuring arrangement and a mechanical measuring arrangement.

7. The machine tool of claim 1, wherein said correcting device has one or more lasers.

8. The machine tool of claim 1, wherein said correcting device determines the distance of one of said spindle and an element connected to said spindle from a reference point.

9. The machine tool of claim 1, wherein said correcting device determines the angle between one of a point on said spindle and on an element connected to said spindle, and two reference points.

10. The machine tool of claim 1, wherein the reference point is arranged on one of a frame of the machine tool and an element independent of the machine tool which carries the reference point.

11. The machine tool of claim 1, further comprising a moveable reference point.

12. The machine tool of claim 1, wherein the reference point is formed by one of an optical transmitter, a receiver and a reflector.

13. The machine tool of claim 1, wherein said correcting device has a transmitter-receiver arrangement.

14. The machine tool of claim 1, wherein a large number of reference points are provided arranged in the manner of a network.

15. The machine tool of claim 1, wherein said correcting device determines and adjusts the position of the axis of said spindle.

16. The machine tool of claim 1, wherein receivers of an optical measuring arrangement are provided on one of said spindle and on said reference point.

17. The machine tool of claim 1, wherein the at least one spindle is held by a holding plate, and said holding plate is mounted via said rods, and said slides are moveable and positioned on guide tracks.

18. The machine tool of claim 1, wherein a first slide carries a guide track of a second slide.

19. The machine tool of claim 1, wherein a slide is connected to said spindle via two of said rods.

20. The machine tool of claim 1, wherein a holding plate bears two or more spindles and said correcting device determines and corrects the position of said holding plate, and one spindle is moved with respect to the position of another spindle by the correcting device.

21. The machine tool of claim 1, wherein a plurality of reference points are arranged in fixed positions on a frame, and an optical transmitter and an optical receiver, which evaluates light reflected back, are arranged on one of said spindle and a supporting plate of said spindle (5).

22. The machine tool of claim 1, wherein the reference point provided is an optical transmitter and one or more reflectors are provided on one of said spindle and a supporting plate, and an optical receiver is provided which evaluates light reflected back.

23. A method of adjusting a position of a tool spindle of a machine tool holding a workpiece in a working space, said method comprising the steps of mounting the spindle via rods on displaceable slides located in a rear space on an opposite side of a wall from the working space, controlling a position of said slides in the rear space by a controller and, as a result, also a position of the tool spindle, providing a correcting device in the rear space which determines an actual position of said spindle, and comparing the actual position with a predetermined position of said spindle by said controller and the position of said slides in the rear space being changed in accordance with a position deviation to bring the actual position close to the predetermined position.

24. The method of claim 23, wherein adjustment of the position of the spindle is carried out by moving said slides.

25. The method of claim 24, wherein the adjustment is carried out as a normalization step before actual use of the machine tool, and said correcting device generates correction data which is stored in said controller as correction information for positioning of said spindle.

26. The method of claim 23, wherein said correcting device is removed from the machine tool after carrying out a normalization step.

27. The method of claim 23, further comprising at least one temperature sensor and, in a normalization step, said correcting device is used to generate a set of correction data with respect to the positioning of said spindle on a basis of temperature.

28. The method of claim 23, wherein said controller selects stored correction information for the positioning of said spindle on a basis of temperature.

* * * * *